United States Patent
Ratasuk et al.

(10) Patent No.: US 11,503,493 B2
(45) Date of Patent: Nov. 15, 2022

(54) ENHANCED TRAFFIC CAPACITY IN A CELL

(71) Applicant: NOKIA TECHNOLOGIES OY, Espoo (FI)

(72) Inventors: Rapeepat Ratasuk, Hoffman Estates, IL (US); Nitin Mangalvedhe, Hoffman Estates, IL (US); Zhiyi Zhou, Chicago, IL (US); Amitava Ghosh, Buffalo Grove, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 79 days.

(21) Appl. No.: 16/958,280

(22) PCT Filed: Dec. 29, 2017

(86) PCT No.: PCT/US2017/068927
§ 371 (c)(1),
(2) Date: Jun. 26, 2020

(87) PCT Pub. No.: WO2019/132974
PCT Pub. Date: Jul. 4, 2019

(65) Prior Publication Data
US 2021/0058813 A1    Feb. 25, 2021

(51) Int. Cl.
*H04W 28/02* (2009.01)
*H04L 12/851* (2013.01)
(Continued)

(52) U.S. Cl.
CPC ......... *H04W 28/02* (2013.01); *H04L 47/2408* (2013.01); *H04L 47/26* (2013.01); *H04L 47/32* (2013.01)

(58) Field of Classification Search
CPC ........ H04W 28/02; H04L 47/26; H04L 47/32; H04L 47/2408
See application file for complete search history.

(56) References Cited

U.S. PATENT DOCUMENTS 6,463,068 B1 * 10/2002 Lin .................. H04L 45/00
370/230
6,657,962 B1 * 12/2003 Barri ................ H04L 47/10
370/235

(Continued)

FOREIGN PATENT DOCUMENTS

WO    WO 2009/008817 A1    1/2009

OTHER PUBLICATIONS

International Search Report and Written Opinion dated May 9, 2019 corresponding to International Patent Application No. PCT/US2017/068927.

*Primary Examiner* — Rasheed Gidado
(74) *Attorney, Agent, or Firm* — Squire Patton Boggs (US) LLP (57) ABSTRACT

Various communication systems may benefit from enhanced cell capacity. For example, certain embodiments may benefit from improved packet capacity by managing transmissions in a cell. A method, in certain embodiments, may include determining at a network node whether a packet is of a service type. The service type may indicate that the packet is discardable. The method may also include calculating at the network node a probability factor or a scheduling adjustment factor for transmission of the packet, when it is determined that the packet is of the service type. In addition, the method may include determining at the network node whether to transmit the packet to a user equipment based on the probability factor, or adjusting at the network node a scheduler metric based on the scheduling adjustment factor.

19 Claims, 5 Drawing Sheets

(51) Int. Cl.
    *H04L 12/823*     (2013.01)
    *H04L 12/825*     (2013.01)
    *H04L 47/2408*     (2022.01)
    *H04L 47/26*     (2022.01)
    *H04L 47/32*     (2022.01)

(56) References Cited

U.S. PATENT DOCUMENTS

| | | | |
|---|---|---|---|
| 6,690,645 B1* | 2/2004 | Aweya | H04L 47/10 370/230 |
| 8,897,132 B2* | 11/2014 | Feroz | H04L 47/32 370/235 |
| 2002/0131365 A1* | 9/2002 | Barker | H04L 47/10 370/235 |
| 2008/0304503 A1* | 12/2008 | Blake | H04L 47/31 370/412 |
| 2009/0067335 A1* | 3/2009 | Pelletier | H04L 47/10 370/238 |
| 2012/0028588 A1* | 2/2012 | Morioka | H04B 7/0848 455/71 |
| 2015/0207735 A1* | 7/2015 | Kuramoto | H04L 45/742 370/392 |
| 2016/0029211 A1* | 1/2016 | Furuta | H04L 9/088 380/270 |
| 2018/0176926 A1* | 6/2018 | Xu | H04W 72/085 |

* cited by examiner

| VoIP/Data User Percentage | VoIP Outage | | Mean Data User Throughput | | Data User Throughput Gain |
|---|---|---|---|---|---|
| | Current | Proposed | Current | Proposed | |
| 75% VoIP, 25% Data | 0.19% | 0.16% | 4.75e4 | 5.02e4 | 5.7% |

ENHANCED TRAFFIC CAPACITY IN A CELL

BACKGROUND

Field

Various communication systems may benefit from enhanced cell capacity. For example, certain embodiments may benefit from improved packet capacity by managing transmissions in a cell.

Description of the Related Art

Third Generation Partnership Project (3GPP) technology, such as Internet of Things (IoT), has been developed to allow for the exchange of data between a massive network of physical device, vehicles, home appliances, and other items. In particular, the IoT network allows for items embedded with electronics, sensors, and/or actuators to communicate with one another, and with other existing 3GPP technologies, such as Long Term Evolution (LTE) or LTE-Advanced (LTE-A). The communication in the IoT network mainly involves the exchange of data packets. An important trend for IoT, however, is the integration of voice communication capability into the devices, in addition to the exchange of data packets.

Use cases for IoT devices having voice communications include, for example, using voice as a user interface, such as a voice command over the network. Other use cases include supporting two-way communication, such as wearable devices, alarms, and eHealth, and improving customer services, such as integrating voice into equipment, such as an automated teller machine (ATM). In other user cases, unidirectional communication can be supported, such as building alarms, public safety announcements, and public notifications.

Voice capability is supported in an LTE network via Voice over LTE (VoLTE). VoLTE, which is based on the Internet Protocol (IP) Multimedia Subsystem (IMS), yields many benefits to operators and end users. VoLTE allows voice to be delivered as part of data flow, thus eliminating the need for a dedicated circuit-switch voice network. VoLTE also offers, fast call setup time, enhanced voice quality with different coded choices, simultaneous voice and data support, resiliency to channel variations, optimized battery consumption, and extended coverage.

SUMMARY

According to certain embodiments, an apparatus may include at least one memory including computer program code, and at least one processor. The at least one memory and the computer program code may be configured, with the at least one processor, to cause the apparatus at least to determine at a network node whether a packet is of a service type. The service type may indicate that the packet is discardable. The at least one memory and the computer program code may also be configured, with the at least one processor, to cause the apparatus at least to calculate at the network node a probability factor or a scheduling adjustment factor for transmission of the packet, when it is determined that the packet is of the service type. In addition, the at least one memory and the computer program code may be configured, with the at least one processor, to cause the apparatus at least to determine at the network node whether to transmit the packet to a user equipment based on the probability factor, or adjust at the network node a scheduler metric based on the scheduling adjustment factor.

A method, in certain embodiments, may include determining at a network node whether a packet is of a service type. The service type may indicate that the packet is discardable. The method may also include calculating at the network node a probability factor or a scheduling adjustment factor for transmission of the packet, when it is determined that the packet is of the service type. In addition, the method may include determining at the network node whether to transmit the packet to a user equipment based on the probability factor, or adjusting at the network node a scheduler metric based on the scheduling adjustment factor.

An apparatus, in certain embodiments, may include means for determining at a network node whether a packet is of a service type. The service type may indicate that the packet is discardable. The apparatus may also include means for calculating at the network node a probability factor or a scheduling adjustment factor for transmission of the packet, when it is determined that the packet is of the service type. In addition, the apparatus may include means for determining at the network node whether to transmit the packet to a user equipment based on the probability factor, or means for adjusting at the network node a scheduler metric based on the scheduling adjustment factor.

According to certain embodiments, a non-transitory computer-readable medium encoding instructions that, when executed in hardware, perform a process. The process may include determining at a network node whether a packet is of a service type. The service type may indicate that the packet is discardable. The process may also include calculating at the network node a probability factor or a scheduling adjustment factor for transmission of the packet, when it is determined that the packet is of the service type. In addition, the process may include determining at the network node whether to transmit the packet to a user equipment based on the probability factor, or adjusting at the network node a scheduler metric based on the scheduling adjustment factor.

According to certain other embodiments, a computer program product may encode instructions for performing a process. The process may include determining at a network node whether a packet is of a service type. The service type may indicate that the packet is discardable. The process may also include calculating at the network node a probability factor or a scheduling adjustment factor for transmission of the packet, when it is determined that the packet is of the service type. In addition, the process may include determining at the network node whether to transmit the packet to a user equipment based on the probability factor, or adjusting at the network node a scheduler metric based on the scheduling adjustment factor.

According to certain embodiments, an apparatus may include at least one memory including computer program code, and at least one processor. The at least one memory and the computer program code may be configured, with the at least one processor, to cause the apparatus at least to determine at a network node whether a packet is of a service type. The service type may indicate that the packet is discardable. The at least one memory and the computer program code may also be configured, with the at least one processor, to cause the apparatus at least to calculate at the network node a probability factor or a scheduling adjustment factor for transmission of the packet from a user equipment, when it is determined that the packet is of the service type. In addition, the at least one memory and the computer program code may be configured, with the at least one processor, to cause the apparatus at least to determine at the network node that the packet of the service type will not be transmitted by a user equipment based on the probability factor, or adjust a scheduler metric based on the scheduling adjustment factor.

A method, in certain embodiments, may include determining at a network node whether a packet is of a service type. The service type may indicate that the packet is discardable. The method may also include calculating at the network node a probability factor or a scheduling adjustment factor for transmission of the packet from a user equipment, when it is determined that the packet is of the service type. In addition, the method may include determining at the network node that the packet of the service type will not be transmitted by a user equipment based on the probability factor, or adjusting a scheduler metric based on the scheduling adjustment factor.

An apparatus, in certain embodiments, may include means for determining at a network node whether a packet is of a service type. The service type may indicate that the packet is discardable. The apparatus may also include means for calculating at the network node a probability factor or a scheduling adjustment factor for transmission of the packet from a user equipment, when it is determined that the packet is of the service type. In addition, the apparatus may include means for determining at the network node that the packet of the service type will not be transmitted by a user equipment based on the probability factor, or means for adjusting a scheduler metric based on the scheduling adjustment factor.

According to certain embodiments, a non-transitory computer-readable medium encoding instructions that, when executed in hardware, perform a process. The process may include determining at a network node whether a packet is of a service type. The service type may indicate that the packet is discardable. The process may also include calculating at the network node a probability factor or a scheduling adjustment factor for transmission of the packet from a user equipment, when it is determined that the packet is of the service type. In addition, the process may include determining at the network node that the packet of the service type will not be transmitted by a user equipment based on the probability factor, or adjusting a scheduler metric based on the scheduling adjustment factor.

According to certain other embodiments, a computer program product may encode instructions for performing a process. The process may include determining at a network node whether a packet is of a service type. The service type may indicate that the packet is discardable. The process may also include calculating at the network node a probability factor or a scheduling adjustment factor for transmission of the packet from a user equipment, when it is determined that the packet is of the service type. In addition, the process may include determining at the network node that the packet of the service type will not be transmitted by a user equipment based on the probability factor, or adjusting a scheduler metric based on the scheduling adjustment factor.

BRIEF DESCRIPTION OF THE DRAWINGS

For proper understanding of the invention, reference should be made to the accompanying drawings, wherein.

DETAILED DESCRIPTION

In certain embodiments, IoT or other Enhanced Machine Type Communications (eMTC) may utilize VoLTE. In such embodiments, voice and/or video data traffic may be supported using a narrowband. In order to increase the system capacity, a network may selectively discard some of the packets. For example, if a network entity determines that there would be no impact to the quality of service, or if the packet delay would likely be larger than the delay budget, then some packets, such as voice packets, may be discarded. This would allow a network to free more resources for IoT or eMTC data.

Figure 1:
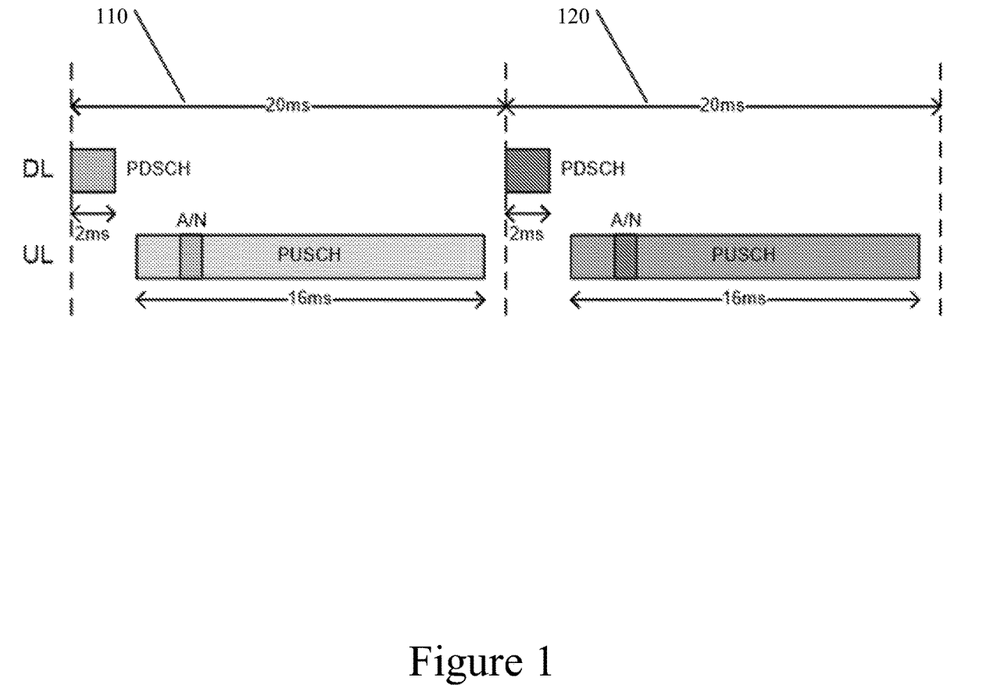
FIG. 1 illustrates an example of a frame according to certain embodiments.

FIG. 1 illustrates an example of a frame according to certain embodiments. In particular, FIG. 1 illustrates an example of a VoLTE transmission diagram for half duplex (HD) frequency division duplex (FDD) eMTC user equipment (UE). A speech frame, in certain embodiments, may arrive every 20 milliseconds (ms) in both downlink and uplink directions. Downlink direction represents a transmission from the network to the user equipment, while an uplink direction represents a transmission from the user equipment to the network. FIG. 1 illustrates a first 20 ms time period 110 and a second 20 ms time period 120. Each of the 20 ms must be divided between uplink and downlink transmissions.

In the embodiment shown in FIG. 1, semi-persistent scheduling (SPS) may be used to allocate 2 ms in the 20 ms time period for downlink transmission, and 16 ms in the 20 ms time period for uplink transmissions. FIG. 1, therefore, illustrates 2 ms allocated for physical downlink sharing channel (PDSCH), while 16 ms are allocated for physical uplink shared channel (PUSCH). In other embodiments, at least part of the 16 ms may be allocated for a physical uplink control channel (PUCCH). Out of 16 ms allocated for uplink transmissions, 15 ms may be used for VoLTE transmission while 1 ms may be used for acknowledgement (A/N) of the downlink VoLTE packet. 18 ms are used for downlink and/or uplink transmissions, while the total switching time between the switching frames may be 2 ms in length.

As discussed above, VoLTE or Video over LTE (ViLTE) may be supported in eMTC or IoT. Certain communication systems may therefore serve as a mixture between voice and/or video traffic, such as VoLTE, and data traffic using the same narrowband. As shown in FIG. 1, however, voice/video traffic takes up a lot of capacity as speech frames are generated every 20 ms. For example, eMTC can support over $1.0 \times 10^5$ IoT users in one narrowband using traffic model from 3GPP TR 45.820, but fewer than 50 VoLTE users. 3GPP TR 45.820 is hereby incorporated by reference in its entirety.

Typically, the network ensures that VoLTE packets are received with high reliability. A VoLTE user may tolerate a certain number of lost packets without impact to service quality. For example, a VoLTE user can still enjoy a high mean opinion score (MOS), which is used to measure the quality of experience of a user, even if 3-4% of the packets are dropped. In addition, a certain amount of resources may be spent on retransmission of such lost packets, even if the packets are eventually dropped or if the packets are not needed to maintain good service quality.

In certain embodiments, therefore, it may be possible for the network to increase system capacity by selectively discarding packets, such as VoLTE or ViLTE packets, that traditionally would have been retransmitted. For example, packets that may not be received within a delay budget and/or packets that may not be needed to maintain good service quality may be discarded. Discarded may mean that either a network entity or a user equipment does not transmit or retransmit the packet.

In certain embodiments, a network entity located within the network, which may be referred to as a scheduler, may discard one or more VoLTE packets, if the network entity determines that there would be either no impact or little impact on the voice quality of service (QoS). The network entity, for example, may be an enhanced NodeB (eNB) or a fifth generation or new radio NodeB (gNB). In other embodiments, the network entity may determine to discard the one or more voice or video packets if the packet delay would likely be larger than the delay budget. The discarding of the packets may act to free up more resources for IoT data traffic.

Figure 2:
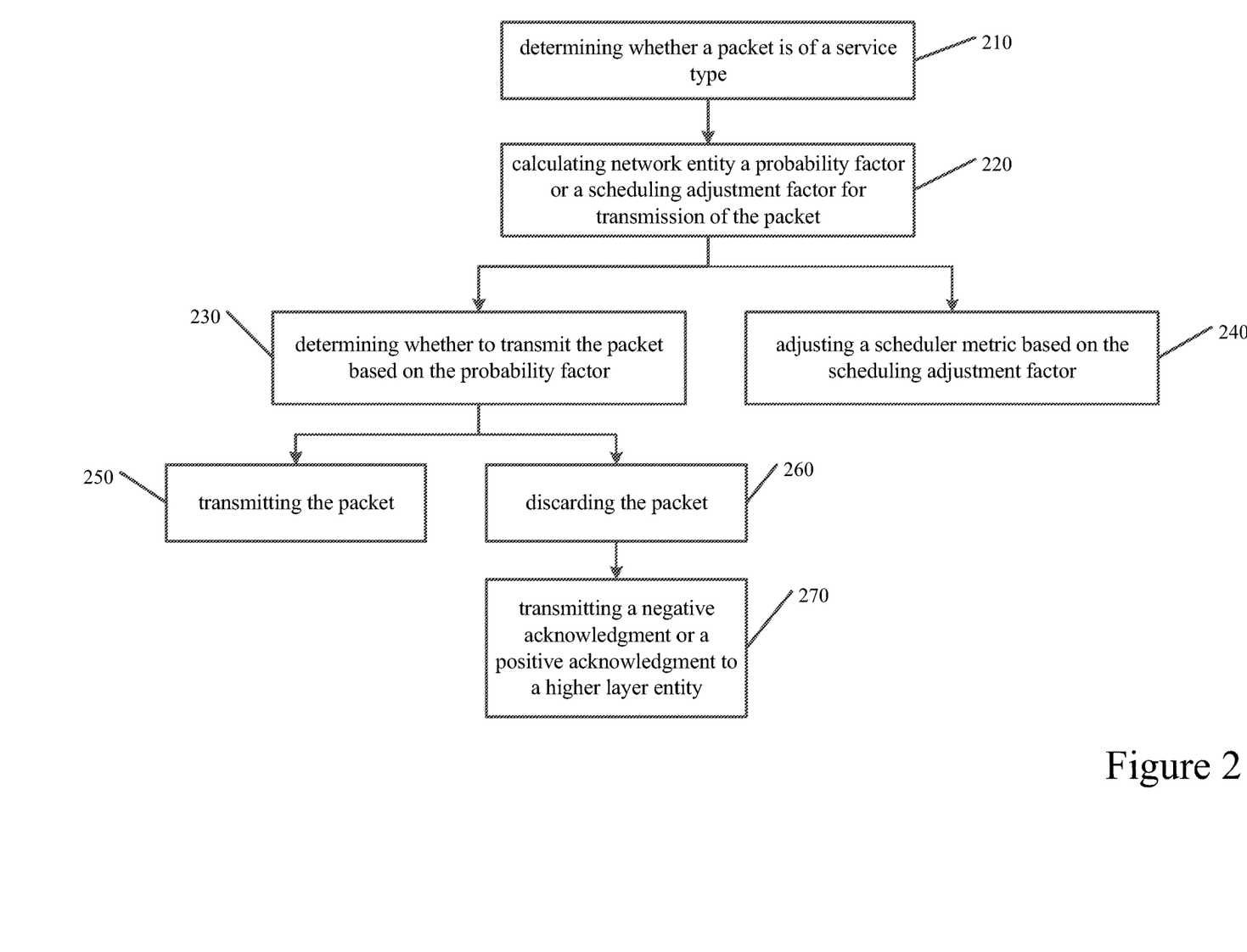
FIG. 2 illustrates an example of a flow diagram according to certain embodiments.

FIG. 2 illustrates an example of a flow diagram according to certain embodiments. In particular, FIG. 2 illustrates a method or process that may be performed by a network entity or a scheduler for downlink transmissions to determine whether a packet needs to be transmitted to a user equipment. In step 210, the network entity may determine whether a packet is of a service type. The service type may indicate that the packet is discardable. In other words, the service type of the packet may indicate that the packet is one that may be discarded by the network. In some embodiments, determining whether a packet is of a service type may be based on the quality of service class identifier (QCI). The packet, for example, may be a voice packet, such as a VoLTE, or a video packet, such as a ViLTE.

In step 220, the network entity may determine or calculate a probability factor (Pv) or a scheduling adjustment factor for transmission of the packet when it is determined that the packet is of the service type. The service type indicates that the packet is discardable. The Pv may therefore be used to determine whether the packet should be transmitted or retransmitted. As shown in step 230, the network entity may determine whether at the network node whether to transmit the packet to a user equipment based on the Pv. The network entity may then determine to transmit the packet to the user equipment based on the determining, as shown in step 250. The transmittal of the packet to the user equipment may be a retransmission.

If the network entity determines that the packet does not need to be transmitted, in step 260, the network entity may determine to discard the packet at the network entity based on the calculated probability factor. The packet, for example, may be a voice packet or a video packet. In step 270, the network entity may transmit a negative acknowledgement to a higher layer entity, such as a Media Access Control layer, a Radio Link Control layer, or a Packet Data Convergence Control layer. The negative acknowledgment may inform the higher layer entity that the packet has been discarded. Alternately, the network entity may return a positive acknowledgement to a higher layer entity. The positive acknowledgment may be used to inform the higher layer entity not to transmit or retransmit the packet, in case the higher layer is agnostic to packet discard.

The probability factor may be calculated based on at least one of a block error rate, a system resource loading, a quality score, a modulation and coding scheme, a repetition level, and/or a received signal to interference plus noise ratio (SINR). For example, the packet may be transmitted or retransmitted from the network entity to the user equipment when the block error rate is higher than a threshold. In other words, if the block error rate is lower than a threshold, the packet may be discarded with a higher probability, or the packet may be transmitted with a lower probability. The threshold may be determined by a network operator or preconfigured in the network.

In certain embodiments, the packet may be transmitted or retransmitted with a higher probability if the system is lightly loaded. The quality score, for example, may be a MOS for VoIP. If the quality score is high, for example, the packet may be discarded. On the other hand, when the score is low, the packet may be transmitted from the network entity to the user equipment. In some other embodiments, the packet may be transmitted or retransmitted with a higher probability if the received SINR, together with the modulation and coding scheme (MCS), and/or the repetition level may indicate that the packet may be successfully received within a delay budget. A delay budget may be a maximum amount of time the scheduler has to successfully transmit or receive a packet. The delay budget may be configured by the network. For example, a the delay budget may be configured by a network operator or preconfigured based on application or QoS requirements.

In certain embodiments, the packet may be transmitted or retransmitted with a probability factor (Pv)=P1 if the residual block error ratio (BLER) is greater than a value T1 or the system load is less than a value of SL1. Else, Pv=P2 where system load is the average number of physical resource blocks (PRBs) being utilized. In one example, the probability and threshold values may be P1=0.75, P2=0.25, T1=0.05, and SL1=0.50.

As described above, the network entity may determine or calculate a Pv or a scheduling adjustment factor for transmission of the packet when it is determined that the packet is of the service type, as described in step 220. In other words, in certain embodiments instead of determining to discard the packet, the scheduler metric may be modified. In step 240, the network entity may adjust a scheduler metric based on the scheduling adjustment factor. Adjusting the scheduler metric may be used to deprioritize the priority of the discardable packet, such that the scheduler may select another packet with a higher priority to schedule instead. Therefore, adjusting the scheduler metrics may improve throughput of the other packet, but does not penalize the discardable packet when there is no other packet waiting to be scheduled. The scheduler metrics may be adjusted based on similar criteria as used by the network to determine whether the packet should be sent based on the probability factor. The scheduling adjustment factor, for example, may be based on at least one of a measured block error rate, a system resource loading, a quality score, and/or a received SINR.

Figure 3:
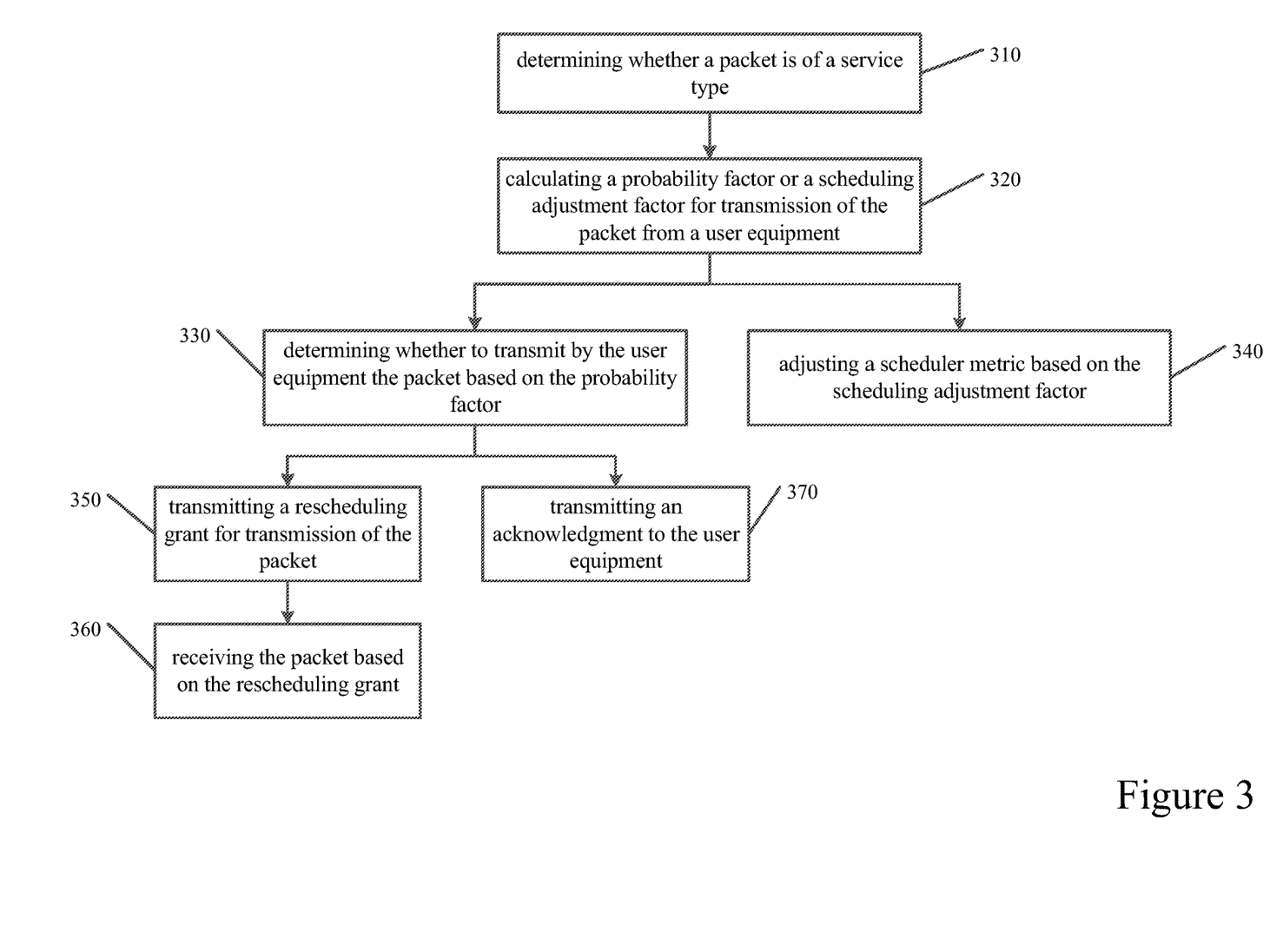
FIG. 3 illustrates an example of a flow diagram according to certain embodiments.

FIG. 3 illustrates an example of a flow diagram according to certain embodiments. In particular, FIG. 3 illustrates a method or process that may be performed by a network entity or a scheduler for uplink transmissions to determine whether a packet needs to be transmitted from the user equipment to the network entity. In uplink transmissions, the network entity, such as eNB or gNB, may not simply discard a packet at the user equipment. The network entity, however, can control the retransmission of the packet from the user equipment to the network. The packet may be a voice packet or a video packet.

In step 310, when a packet may need to be retransmitted, the network node may determine whether a packet is of a service type. The service type indicates that the packet is discardable. The service type of the packet may be determined based on several factors such as QCI, information from an application layer, a network or operator configuration, a service configuration, and/or a configuration of the user equipment, for example, if the UE is configured for transmission using SPS. In step 320, the network node may calculate at the network node a probability factor or a scheduling adjustment factor for transmission of the packet from a user equipment, when it is determined that the packet is of the service type. The probability factor or the scheduling adjustment factor is calculated based on at least one of a block error rate, a system resource loading, a quality score, a modulation and coding scheme, a repetition level, and a received signal to interference plus noise ratio.

The network node, in step 330, may then determine whether the packet of the service type is transmitted by a user equipment based on the probability factor. For example, the network node may determine that the packet is to be transmitted from the user equipment when the block error rate is higher than a threshold. In certain other embodiments, the packet may be transmitted from the user equipment when the system resource loading is lightly loaded.

In step 340, the network node may adjust a scheduler metrics based on the scheduling adjustment factor. The network node, in certain embodiment, may determine that the user equipment should transmit or retransmit the packet. In step 350, the network node may transmit to the user equipment a rescheduling grant for the transmission of the packet based on the determining. The transmitting of the rescheduling grant may be explicit or implicit, for example, implicitly based on acknowledgment or negative acknowledgment. In step 360, the network node may receive the packet from the user equipment based on the rescheduling grant. The received packet may be a retransmission from the user equipment to the network node.

On the other hand, when the network node determines that the packet will not be retransmitted, the network node may transmit an acknowledgement to the user equipment, as shown in step 370. After the acknowledgment is transmitted, an uplink packet failure may be experienced.

In some embodiments, the probability factor may be extended to initial packets generated at the application layer. For example, the initial packets may be voice coder, also known as vocoder, for voice over internet protocol.

Figure 4:
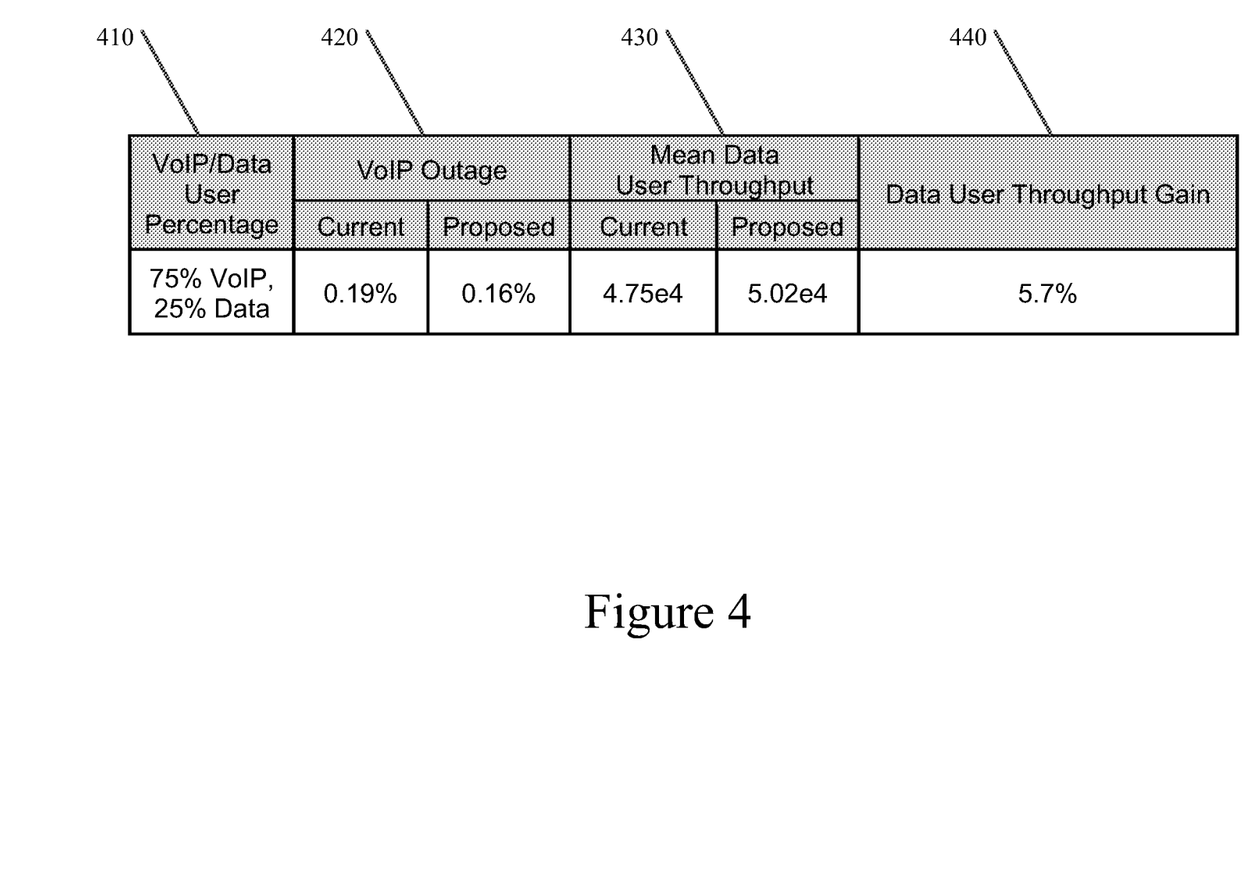
FIG. 4 illustrates an example of a chart according to certain embodiments.

FIG. 4 illustrates an example of a chart according to certain embodiments. In particular, FIG. 4 illustrates performance gain in a 3GPP case 1, with a system identification number (SID) 500, a 5 megahertz (MHz) bandwidth, a single transmitter (Tx), and two receivers (Rx). The example of FIG. 4 shows performance gain using the process or method described in FIGS. 2 and 3. The chart includes a VoIP or data user percentage 210, a VoIP outage 220, a mean data user throughput 230, and a data user throughout gain 240. Specifically, the percentage is split 75% VoIP and 25% data. The propose VoIP outage is improved by 0.03%, the mean data user throughout is increased to $5.02 \times 10^{24}$, and the data user throughput gain is improved by 5.7%. In other words, when the IoT traffic is considerable, the gain can be considerable. This may lead to an additional 6E3 IoT devices supported with the cell using the method or process shown in FIGS. 2 and 3.

Figure 5:
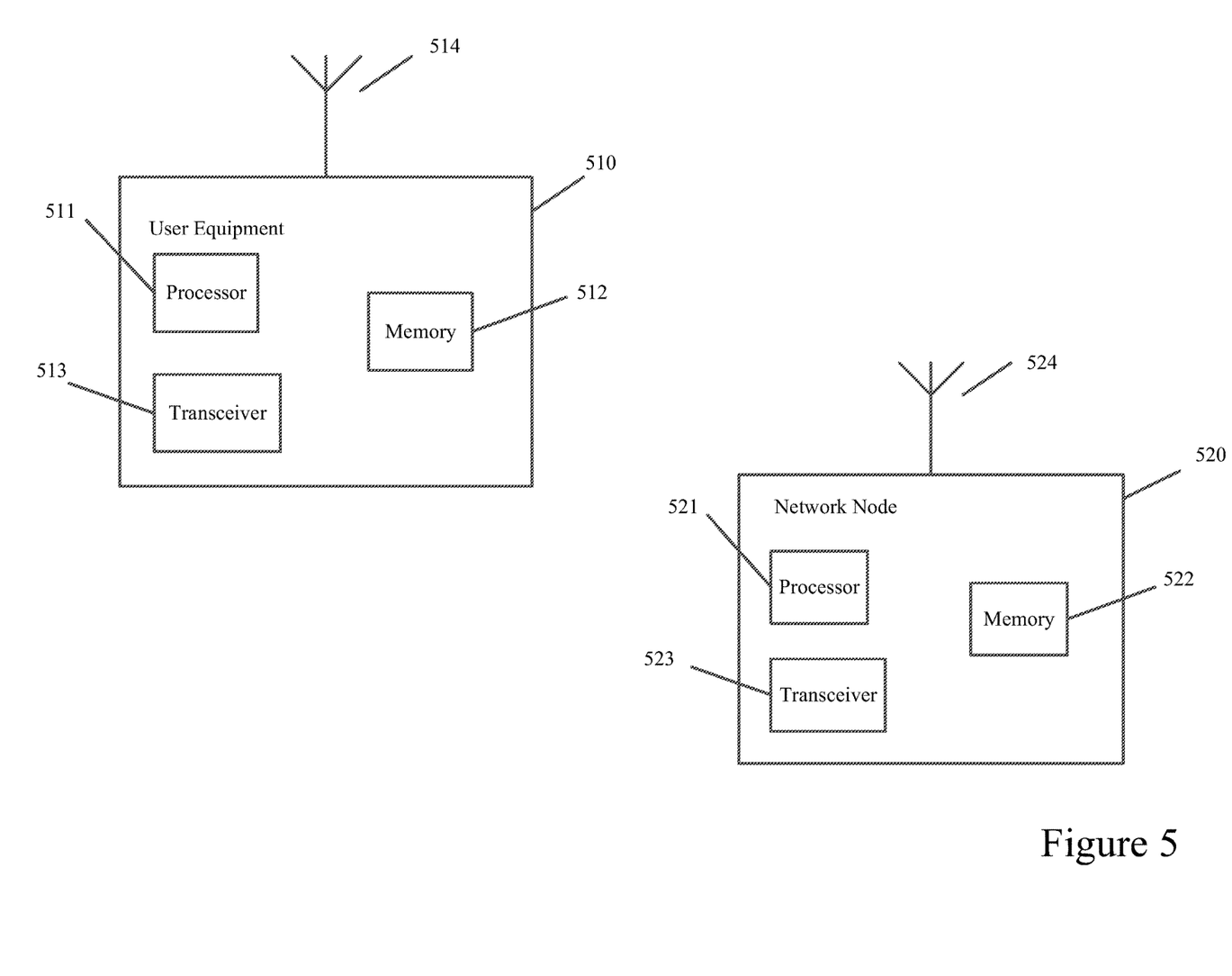
FIG. 5 illustrates an example of a system according to certain embodiments.

FIG. 5 illustrates a system according to certain embodiments. It should be understood that each signal or block in FIGS. 1-4 may be implemented by various means or their combinations, such as hardware, software, firmware, one or more processors and/or circuitry. In one embodiment, a system may include several devices, such as, for example, a network entity 520 or a UE 510. The system may include more than one UE 510 and more one network entity 520, although only one network entity is shown for the purposes of illustration. The network entity may be a network node, an access node, a base station, a eNodeB, a gNB, server, host, or any of the other access or network node discussed herein.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Higher category UEs generally include multiple antenna panels. Other configurations of these devices, for example, may be provided. For example, network entity 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. In other embodiments, the UAVs or the network entity may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server. A beamformer may be a type of transceiver.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the UE may be a machine type communication (MTC) device or an Internet of Things device, which may not require human interaction, such as a sensor, a meter, or an actuator.

In some embodiments, an apparatus, such as a network entity, may include means for carrying out embodiments described above in relation to FIGS. 1-4. In certain embodiments, at least one memory including computer program code can be configured to, with the at least one processor, cause the apparatus at least to perform any of the processes described herein.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 520 or UE 510, to perform any of the processes described above (see, for example, FIGS. 1-4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 5 illustrates a system including a network entity 520 and UE 510, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 510 may likewise be provided with a variety of configurations for communication other than communication network entity 520. For example, the UE 510 may be configured for device-to-device or machine-to-machine transmission.

The above embodiments may provide for significant improvements to the functioning of a network and/or to the functioning of the network entities within the network. Specifically, certain embodiments may discard some voice or video packets when the network entity determines that there would be no impact to the voice or video quality of service, or if the packet delay would likely be larger than the delay budget. Discarding the voice or video packets may free up more resources for IoT data traffic. This may increase the system capacity for data transmissions, thereby improving the efficiency of the network as a whole, and allowing for increased IoT device data transmissions within a given cell.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although many of the above embodiments are directed to 3GPP IoT technology, the embodiments may apply to any other 3GPP technology, such as 5G, NR, $4^{th}$ generation (4G), 3rd generation (3G), LTE, or LTE-A.

Partial Glossary

IoT Internet of Things
3GPP Third Generation Partnership Project
LTE Long Term Evolution
LTE-A LTE Advanced
VoLTE Voice over LTE
ViLTE Video over LTE
eMTC Enhanced Machine Type Communication
UE User Equipment
SPS Semi-Persistent Scheduling
PDSCH Physical Downlink Sharing Channel
PUSCH Physical Uplink Shared Channel
PDCCH Physical Downlink Control Channel
PUCCH Physical Uplink Control Channel
MOS Mean Opinion Score
QCI Quality of Service Class Identifier
MCS Modulation and Coding Scheme
Pv Probability Factor
SINR Signal to Interference plus Noise Ratio
eNB Enhanced NodeB

We claim:
1. An apparatus comprising:
at least one processor; and
at least one memory including computer program code,
wherein the at least one memory and the computer program code are configured to, with the at least one processor, cause the apparatus at least to:
determine at a network node whether a packet is of a service type, wherein the service type indicates that the packet is discardable;
calculate at the network node a probability factor or a scheduler metric for transmission of the packet, when it is determined that the packet is of the service type; and
determine at the network node whether to transmit the packet to a user equipment based on the probability factor, or
adjust at the network node the scheduler metric to deprioritize transmission of the packet, wherein the service type of the packet is determined based on at least a quality of service class identifier, and wherein the probability factor or the scheduler metric is calculated based on at least one of a block error rate, a system resource loading, a quality score, a modulation and coding scheme, a repetition level, and a received signal to interference plus noise ratio.

2. The apparatus according to claim 1, wherein the at least one memory and the computer program code are further configured to, with the at least one processor, cause the apparatus at least to:
transmit the packet from the network node to the user equipment based on the determining.

3. The apparatus according to claim 1, wherein the at least one memory and the computer program code are further configured to, with the at least one processor, cause the apparatus at least to:
discard the packet at the network node based on the probability factor.

4. The apparatus according to claim 3, wherein the at least one memory and the computer program code are further configured to, with the at least one processor, cause the apparatus at least to:
transmit a negative acknowledgment or a positive acknowledgment from the network node to a higher layer entity, wherein the negative acknowledgment or the positive acknowledgment informs the higher layer entity that the packet has been discarded.

5. The apparatus according to claim 1, wherein the service type of the packet is further determined based on at least one of information from an application layer, a network configuration, a service configuration, or configuration of the user equipment.

6. The apparatus according to claim 1, wherein the packet is transmitted from the network node to the user equipment when the block error rate is higher than a threshold.

7. The apparatus according to claim 1, wherein the packet is transmitted from the network node to the user equipment when the system resource loading is lightly loaded.

8. The apparatus according to claim 1, wherein the packet is transmitted from the network node to the user equipment when the quality score is a low score.

9. The apparatus according to claim 1, wherein the packet comprises a voice packet or a video packet.

10. An apparatus comprising:
at least one processor; and
at least one memory including computer program code, wherein the at least one memory and the computer program code are configured to, with the at least one processor, cause the apparatus at least to:
determine at a network node whether a packet is of a service type, wherein the service type indicates that the packet is discardable;
calculate at the network node a probability factor or a scheduler metric for transmission of the packet from a user equipment, when it is determined that the packet is of the service type; and
determine at the network node whether the packet of the service type is transmitted by a user equipment based on the probability factor, or
adjust the scheduler metric to deprioritize transmission of the packet,
wherein the service type of the packet is determined based on at least a quality of service class identifier, and
wherein the probability factor or the scheduler metric is determined based on at least one of a block error rate, a system resource loading, a quality score, a modulation and coding scheme, a repetition level, and a received signal to interference plus noise ratio.

11. The apparatus according to claim 10, wherein the at least one memory and the computer program code are further configured to, with the at least one processor, cause the apparatus at least to:
transmit from the network entity to the user equipment a rescheduling grant for the transmission of the packet based on the determining.

12. The apparatus according to claim 11, wherein the transmitting of the rescheduling grant is explicit or implicit.

13. The apparatus according to claim 11, further wherein the at least one memory and the computer program code are further configured to, with the at least one processor, cause the apparatus at least to:
receive the packet at the network node from the user equipment based on the rescheduling grant.

14. The apparatus according to claim 10, wherein the at least one memory and the computer program code are further configured to, with the at least one processor, cause the apparatus at least to:
transmit an acknowledgment from the network entity to the user equipment.

15. The apparatus according to claim 10, wherein the transmission of the voice packet from the user equipment is a retransmission.

16. The apparatus according to claim 10, wherein the service type of the packet is further determined based on at least one of information from an application layer, a network congestion, a service configuration, or configuration of the user equipment.

17. The apparatus according to claim 10, wherein the determining that the packet is transmitted from the user equipment when the block error rate is higher than a threshold.

18. A method comprising:
determining at a network node whether a packet is of a service type, wherein the service type indicates that the packet is discardable;
calculating at the network node a probability factor or a scheduler metric for transmission of the packet, when it is determined that the packet is of the service type; and
determining at the network node whether to transmit the packet to a user equipment based on the probability factor, or
adjusting at the network node the scheduler metric to deprioritize transmission of the packet,
wherein the service type of the packet is determined based on at least a quality of service class identifier, and
wherein the probability factor or the scheduler metric is calculated based on at least one of a block error rate, a system resource loading, a quality score, a modulation and coding scheme, a repetition level, and a received signal to interference plus noise ratio.

19. A method comprising:
determining at a network node whether a packet is of a service type, wherein the service type indicates that the packet is discardable;
calculating at the network node a probability factor or a scheduler metric for transmission of the packet from a user equipment, when it is determined that the packet is of the service type; and
determining at the network node whether the packet of the service type is transmitted by a user equipment based on the probability factor, or adjusting the scheduler metric to deprioritize transmission of the packet,
wherein the service type of the packet is determined based on at least a quality of service class identifier, and
wherein the probability factor or the scheduler metric is determined based on at least one of a block error rate, a system resource loading, a quality score, a modulation and coding scheme, a repetition level, and a received signal to interference plus noise ratio.

* * * * *